US011360050B2

(12) United States Patent
McCarthy et al.

(10) Patent No.: US 11,360,050 B2
(45) Date of Patent: Jun. 14, 2022

(54) HOSES, AND DETECTING FAILURES IN REINFORCED HOSES

(71) Applicant: GE OIL & GAS UK LIMITED, Bristol (GB)

(72) Inventors: John Charles McCarthy, Abingdon (GB); David John Buttle, Abingdon (GB)

(73) Assignee: BAKER HUGHES ENERGY TECHNOLOGY UK LIMITED, Bristrol (GB)

( * ) Notice: Subject to any disclaimer, the term of this patent is extended or adjusted under 35 U.S.C. 154(b) by 454 days.

(21) Appl. No.: 16/094,592

(22) PCT Filed: Apr. 21, 2017

(86) PCT No.: PCT/EP2017/059486

§ 371 (c)(1),
(2) Date: Oct. 18, 2018

(87) PCT Pub. No.: WO2017/182614

PCT Pub. Date: Oct. 26, 2017

(65) Prior Publication Data

US 2020/0326311 A1 Oct. 15, 2020

(30) Foreign Application Priority Data

Apr. 22, 2016 (GB) ..................................... 1607026

(51) Int. Cl.
*G01N 27/90* (2021.01)
*E21B 47/007* (2012.01)
(Continued)

(52) U.S. Cl.
CPC ............. *G01N 27/90* (2013.01); *E21B 17/01* (2013.01); *E21B 47/007* (2020.05); *F16L 11/081* (2013.01)

(58) Field of Classification Search
CPC ....... G01N 27/90; F16L 11/081; E21B 47/007
See application file for complete search history.

(56) References Cited

U.S. PATENT DOCUMENTS

| | | | | |
|---|---|---|---|---|
| 7,876,096 | B2 | 1/2011 | Buttle | |
| 2009/0015249 | A1* | 1/2009 | Buttle | ................ G01N 27/9046 324/240 |
| 2014/0312888 | A1 | 10/2014 | Vinogradov | |

FOREIGN PATENT DOCUMENTS

| | | | |
|---|---|---|---|
| CN | 103983688 | A | 8/2014 |
| CN | 104502443 | A | 4/2015 |

(Continued)

*Primary Examiner* — Minh Q Phan
(74) *Attorney, Agent, or Firm* — Baker Hughes Patent Organization

(57) ABSTRACT

A hose includes a generally cylindrical tubular structure with at least one layer of steel ligaments near the outer surface, the steel ligaments being enclosed within a tubular layer including polymeric material; the flexible hose also incorporates a multiplicity of sensing coils embedded within the tubular layer, each such sensing coil being a flat coil lying in a plane substantially parallel to the adjacent layer of steel ligaments, so that an axis of the coil orthogonal to the plane of the flat coil extends in a radial direction relative to the hose. Each such sensing coil may form part of an electronic module that also incorporates a signal processing circuit and an RE power-receiving and data-transmission circuit. When that portion of the hose is subjected to an alternating magnetic field, signals from the sensing coils can be analysed to deduce information about the stress in the steel ligaments.

15 Claims, 3 Drawing Sheets

35
35
34
32
30
19
17
18
20

(51) Int. Cl.

| | |
|---|---|
| ***E21B 17/08*** | (2006.01) |
| ***E21B 17/01*** | (2006.01) |
| ***F16L 11/08*** | (2006.01) |

(56) References Cited

FOREIGN PATENT DOCUMENTS

| | | | | | |
|---|---|---|---|---|---|
| DE | 102011122481 | A1 | | 6/2013 | |
| EP | 0025344 | A1 | * | 3/1981 | ............ G01M 3/047 |
| EP | 0228177 | A2 | | 7/1987 | |
| GB | 1246786 | A | | 9/1971 | |
| JP | H1151905 | A | | 2/1999 | |
| WO | WO-2009051783 | A1 | * | 4/2009 | ........... G01R 33/028 |
| WO | 2012062328 | A1 | | 5/2012 | |
| WO | 2014096817 | A1 | | 6/2014 | |

* cited by examiner

HOSES, AND DETECTING FAILURES IN REINFORCED HOSES

FIELD OF THE INVENTION

Embodiments of the invention relate to flexible, reinforced hoses that comprise steel wires, and to a method for inspecting or monitoring such hoses, for detecting failures in steel wires within the hose. A hose refers to a flexible tubular conduit for conveying a fluid; and some types of hose are reinforced by the provision of steel wires or ligaments within the hose wall. The steel wires or ligaments provide some stiffness to the hose, but the hose is nevertheless flexible. For example embodiments of the invention are applicable to the types of hose that are referred to as flexible risers.

BACKGROUND OF THE INVENTION

Flexible risers are used to connect oil and gas wells to floating production platforms, the flexible riser being a flexible hose which includes steel wires or steel ligaments as reinforcement. Typically such a riser is connected to a turret on the floating platform, the turret providing some degree of rotation, or is otherwise connected to fixed pipework on the floating platform, and the flexible riser may be hundreds or thousands of metres long. Failure in such a flexible riser can lead to significant quantities of oil leaking into the environment. It has been found that such risers typically fail close to the point at which the riser is connected to the turret, or to a support point along its length. This failure may arise as a consequence of corrosion caused by damage to the outer layers of the riser, or may be due to the fatigue loading endured by the riser at the point where the forces are greatest due to wave motion and rotation of the floating platform. This failure mode is recognised, and U.S. Pat. No. 7,876,096 (MAPS Technology Ltd) describes a way to inspect such risers to warn of the risk of failure, applicable with the flexible riser in situ connected to the turret and carrying a product.

As described in U.S. Pat. No. 7,876,096, an electromagnetic probe may be used to detect stress in the reinforcing wires or ligaments, but the measurements are complicated by the gaps between adjacent ligaments, which are typically not uniform and may vary during use. In addition, to reduce the risk of this type of failure the riser may be provided with a stiffening sleeve adjacent to the point at which the riser is connected to the turret, and such a stiffening sleeve would impede such a measurement or detection process.

SUMMARY OF THE INVENTION

According to one aspect of embodiments of the present invention there is provided a flexible hose comprising a generally cylindrical tubular structure comprising at least one layer of steel ligaments near the outer longitudinally-extending surface, the steel ligaments being enclosed within a tubular layer comprising polymeric material, wherein the flexible hose also incorporates a multiplicity of sensing coils embedded within the tubular layer, each such sensing coil being a flat coil lying in a plane substantially parallel to the adjacent layer of steel ligaments, so that an axis of the coil orthogonal to the plane of the flat coil extends in a radial direction relative to the tubular structure.

Each such sensing coil must be connected to a circuit whereby signals sensed by the coil can be detected or monitored. Each coil may therefore be connected electrically to a signal processing circuit for amplifying and digitising signals from the coil. Each coil may for example be mounted on a flexible circuit board that is embedded within the tubular layer, the circuit board also carrying circuits for amplifying and digitising signals from the coil. The signal processing circuit may also include a power-receiving circuit for obtaining power from a radio-frequency electromagnetic field or from an alternating magnetic field, and a transmission circuit for transmitting data by radio-frequency signals to an external radio-frequency receiver. The power-receiving circuit may also receive timing information. Such a power-receiving circuit and such a transmission circuit may also be incorporated on the circuit board.

The provision of such a power-receiving circuit and a transmission circuit, in combination with the signal processing circuit, ensures that the sensing coil can function without any direct connection to any external circuits. Like an RFID device, the circuits associated with the sensing coil can pick up electric power and timing data from a radio-frequency signal, amplify and digitise the detected signals from the coil, and optionally resolve the detected signals into in-phase and quadrature components, and then transmit that data by a radio-frequency signal to the external radio-frequency receiver.

In a similar way to that described in U.S. Pat. No. 7,876,096, the stress in the steel wires can be determined from the signals from the sensing coils, if the steel wires are subjected to an alternating magnetic field less than saturation. This requires use of at least one drive coil to create the magnetic field, and a current source to supply an alternating current to the drive coil to induce an alternating magnetic field; the alternating magnetic field should be significantly less than that required to cause saturation in the steel ligaments. The current source may be arranged to supply a plurality of different frequencies in succession.

From the signals representing the flux density sensed by each sensing coil when the adjacent ligaments are subjected to the alternating magnetic field, a parameter can be deduced which is sensitive to stress in the ligaments; and from any variation of this parameter between different ligaments you can detect if any ligaments have broken or are over-stressed. The measurement process enables the stress to be monitored in each ligament during operation of the hose or riser. The measurement of stress allows the fatigue damage within the ligaments to be calculated, and the remaining life of the hose or riser estimated more accurately.

Flexible hoses used as risers usually include at least two helically-wound steel wire layers, and sometimes more layers, and the failure mode typically involves fatigue fracture of one of the outer steel reinforcing wires or ligaments. When a wire or ligament fails in this way, the remaining intact wires must take the extra load, and therefore their total stress increases. By monitoring the stress in all the ligaments, the failure of one or more wires or ligaments will be evident from the variation of the measured stresses. Where a ligament has broken, its stress will be significantly reduced, and this may be detected. An increase in stress in one region may indicate the failure of a ligament in a nearby region. An increase in stress might also indicate a failure in one of the reinforcing elements further below the surface. Since the measurements are of the stress, the measurement may be made up to several metres along the hose or riser from the location of the fracture, as changes in stress due to a fracture will be experienced by the wires along several metres of their length.

Thus, in a second aspect, embodiments of the the present invention provide a method of monitoring or measuring stress in ligaments within a hose such as a riser, where the hose has the features described above.

In performing the method, an alternating magnetic field is applied which must have at least a component in a radial direction (relative to the riser) in the vicinity of a sensing coil, and so parallel to the axis of the sensing coil. The alternating magnetic field may have a component parallel to the wires within the riser, or may be orthogonal to the wires.

In one method of operation the hose or riser in the vicinity of the sensing coils is subjected to an alternating magnetic field which is partly parallel to the longitudinal axis of that portion of the hose or riser, for example by arranging at least one drive coil that encircles the hose or riser in the vicinity of the sensing coils. This may utilise two drive coils spaced apart axially, the sensing coils being those adjacent to the two drive coils. Instead there may be two yokes spaced apart axially, each yoke having a radially-extending pole piece.

In an alternative method of operation the hose or riser in the vicinity of the sensing coils is subjected to an alternating magnetic field in a direction that is radial relative to the longitudinal axis of that portion of the riser; this may be achieved using a drive coil in combination with a ferromagnetic yoke with radially-extending pole pieces, for example a semi-circular yoke with radially-extending pole pieces on opposite ends, so that the pole pieces are diametrically opposite each other. As another example a circular yoke might be arranged to surround the hose or riser, the yoke being provided with several radially-extending pole pieces, with a drive coil on each such pole piece. In this case the alternating magnetic field may be generated by energising one pair of drive coils at any one time for example a pair of diametrically opposite drive coils, or by energising two adjacent drive coils and also two diametrically opposite drive coils.

The stress-measurement method may involve resolving signals from the sensors into a component of the magnetic flux density in phase with the alternating magnetic field, and a component of the magnetic flux density which is in quadrature with the alternating magnetic field, and hence deducing a stress-dependent parameter which is substantially unaffected by lift-off; the signal analysis may utilise measurements taken at several different frequencies of the alternating magnetic field. The signals from the sensor coils are, in an embodiment, digitised before they are analysed.

Another aspect of embodiments of the invention provides an electronic sensor for incorporation in such a flexible hose, the electronic sensor comprising at least one sensing coil connected to a signal processing circuit for amplifying and digitising signals from the coil, whereby signals sensed by the coil can be detected or monitored, and a transmission circuit for transmitting data by radio-frequency signals to an external radio-frequency receiver.

The signal processing circuit may also include a power-receiving circuit for obtaining power from a radio-frequency electromagnetic field or from an alternating magnetic field. The power-receiving circuit may also receive timing information. Each such electronic sensor may be mounted on a flexible circuit board that may then be embedded within the tubular layer of the flexible hose. In an embodiment multiple such electronic sensors are incorporated along the length of a tape which may be wound around the periphery of the hose during manufacture of the hose, the tape then being covered by a polymer layer.

Embodiments of the invention will be described below primarily in the context of a flexible riser, but it will be appreciated that it is applicable in a wide range of different hoses that include one or more layers of steel wires below a tubular outer layer of polymeric material. Such reinforced hoses may for example be used to transport liquid fuels between buildings at a storage depot.

BRIEF DESCRIPTION OF THE DRAWINGS

Embodiments of the invention will now be further and more particularly described, by way of example only, and with reference to the accompanying drawings, in which.

DETAILED DESCRIPTION

Figure 1:
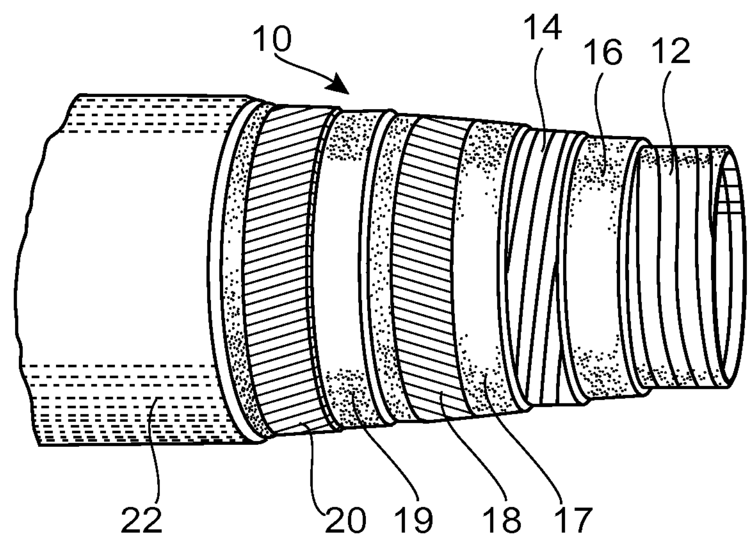
FIG. 1 shows a perspective cut-away view of part of a riser, to show its internal structure.

Referring to FIG. 1, a flexible riser 10, which acts as a hose to carry a pressurised fluid, has several concentric layers. An innermost layer 12 of helically wound bent steel strip provides resistance against external pressures, and a similar helically wound steel strip layer 14 provides hoop strength, and between these layers is a fluid barrier layer 16 of polymeric material. These are surrounded by two layers 18 and 20 of helically-wound steel ligaments or wires to provide tensile strength, the steel ligaments or wires within each layer 18 and 20 being wound side-by-side. Although adjacent ligaments or wires within a layer 18 or 20 are shown as being in contact, in practice there are gaps between adjacent wires within the layer 18 or 20; such gaps ensure the flexibility of the riser 10. For example there may be 5 mm wide gaps between adjacent ligaments or wires in each layer 18 and 20, although in practice the gaps will not be of constant or consistent width as the riser 10 flexes. In an example each ligament in the layer 20 may be of width 12 mm and thickness 5 mm. Each ligament in the inner layer 18 is of the same dimensions as those of the outer layer 20, although alternatively it may be of different dimensions.

The layers 18 and 20 are separated from the steel strip layer 14 and from each other by respective anti-wear layers 17 and 19, each of which may for example be of thickness 1 mm or 2 mm. A polymeric layer 22 provides an external sleeve and fluid barrier; this layer 22 may be of thickness up to 80 mm, for example 50 mm, 30 mm, 20 mm or 12 mm. Where the layer 22 is more than 20 mm thick it may also incorporate thermal insulation to suppress heat loss from the fluid within the riser. As discussed above, the failure mode with such a riser 10 is typically the failure of one or more ligaments in the outermost layer 20. But it will be appreciated that these ligaments cannot be observed directly, because they are enclosed within the polymeric layer 22.

Figure 2:
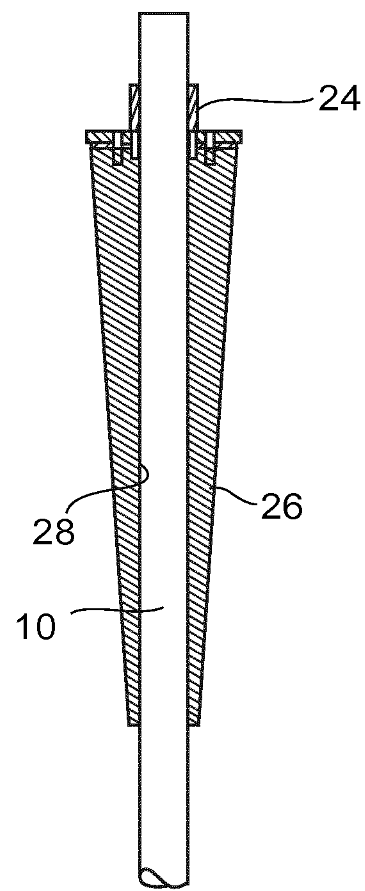
FIG. 2 shows a schematic side view of a connection between the riser and a floating platform, showing a stiffening sleeve.

Referring now to FIG. 2, such a riser 10 may be used to carry pressurised fluids from a wellhead at the seabed to a floating production platform. The top end of the riser 10 is therefore clamped to an end fitting 24 (indicated schematically) within the floating production platform (not shown), and to reduce stress concentrations at the connection between the riser 10 and the end fitting 24, the end portion of the riser 10 just below the end fitting 24 is provided with a tapered stiffening sleeve 26. This may be for example of a plastics material such as polyurethane, and tapers to its smallest diameter at the bottom end of the stiffening sleeve 26. The stiffening sleeve 26 defines a bore 28 which fits tightly around the outside of the riser 10. Consequently, as the production platform moves because of waves, wind or tide, the riser 10 can flex along its length, and the stress concentration at the top end is spread out over the entire length of the stiffening sleeve 26.

Although such a stiffening sleeve 26 reduces the risk of failure of any of the ligaments in the layers 18 or 20, it does not entirely eliminate that risk. It would therefore be desirable to be able to measure the stress in the ligaments of at least the outermost layer 20, and, in an embodiment, in both the layers 18 and 20, in the portion of the riser 10 that is within the stiffening sleeve 26. However, it may be impractical to perform this measurement using an electromagnetic probe, as described in U.S. Pat. No. 7,876,096, because a probe outside the stiffening sleeve 26 would be remote from the ligaments in the outermost layer 20.

Figure 3:
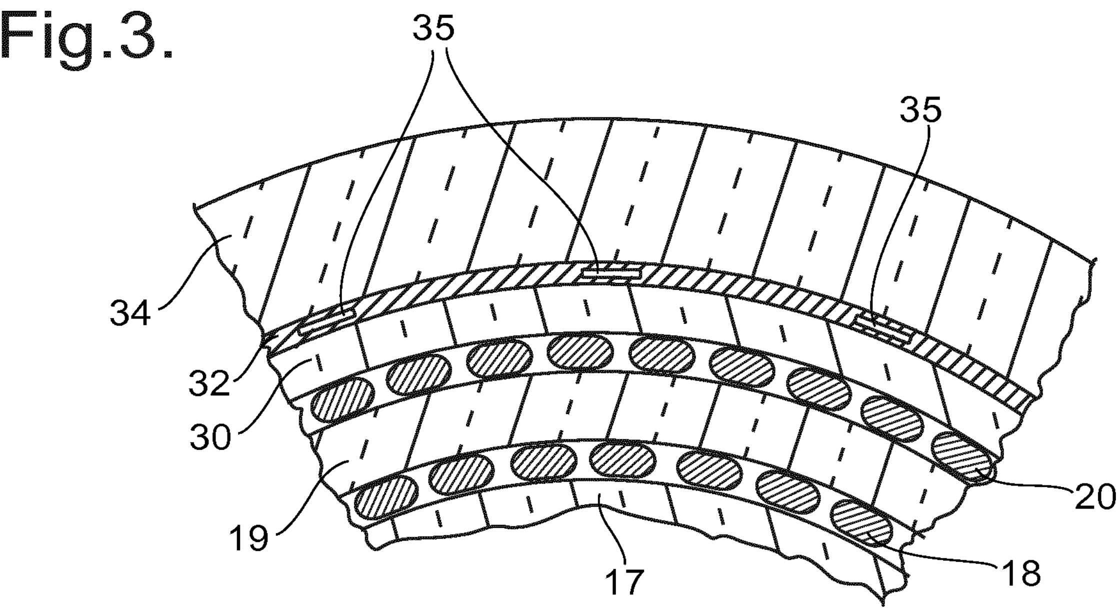
FIG. 3 shows a schematic cross-sectional view through part of the riser of FIG. 1, incorporating electronic modules.

Referring now to FIG. 3 there is shown a transverse sectional view through the riser 10, showing only the outermost layers of the riser 10, in more detail than in FIG. 1; this view is schematic, and not to scale. There are two layers 18 and 20 of helically-wound steel ligaments or wires to provide tensile strength, the steel ligaments or wires within each layer 18 and 20 being wound side-by-side, with narrow gaps between adjacent wires within the layer 18 or 20. Inside the inner layer 18 is an anti-wear layer 17; and between the layers 18 and 20 is an anti-wear layer 19. These features are as described previously. Outside the outer layer 20 of steel ligaments or wires there may optionally be a layer or inner sheath 30 of polymeric material which may be produced by extrusion so it is a continuous tube, and may be of thickness up to 5 mm or 10 mm. This inner sheath 30 is surrounded by a layer 32 of tape that is wound around the riser 10. Alternatively the inner sheath 30 may be omitted; and in this case the layer 32 is wound directly around the outer layer 20 of steel ligaments or wires. The layer 32 of tape in either case may be made of tapes of two or more different types, and may be of thickness 1 or 2 mm, and generally less than 5 mm. Outside the layer 32 of tape is an outer sheath 34 of polymeric material which may be produced by extrusion so it is a continuous tube. In other embodiments there may be layers of thermal insulation (not shown), which may be applied in the form of thick tapes, and may be between the layer 32 and the outer sheath 34. It will be appreciated that the inner sheath 30 (where provided), the layer 32 of tape, the thermal insulation (where provided), and the outer sheath 34 together correspond to the polymeric layer 22 that provides the external sleeve and fluid barrier as described above. It will be appreciated that the dimensions of components of the riser 10 are given only by way of illustration.

Within the layer 32 of tape are multiple flexible electronic modules 35. These are sufficiently flexible and thin that they can be incorporated into a tape at intervals along its length, and the tape is wound around the riser 10. Typically the tape that incorporates the flexible electronic modules 35 would be an additional tape to the tape or tapes mentioned above as constituting the layer 32. Consequently there are multiple flexible electronic modules 35 spaced apart from each other around the circumference, and spaced radially away from the ligaments of the outer layer 20 by the thickness of the inner sheath 30, which may for example be in the range 5 mm to 10 mm. During the manufacture of the riser 10 such a layer 32 of tape that incorporates flexible electronic modules 35 may be wound around a section of the riser 10 of length typically between 1 m and 3 m, near an end of the riser 10 that is to be fixed to the end fitting 24 in the floating production platform. The tape is wound at an angle to the longitudinal axis, so successive turns of the tape are not on top of each other, and there are therefore multiple electronic modules 35 spaced apart both axially and circumferentially over that section of the riser 10.

Figure 4:
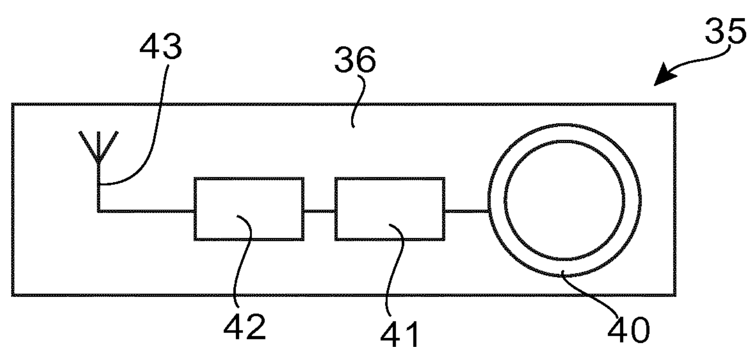
FIG. 4 shows a schematic view of the electronic module of FIG. 3.

Referring now to FIG. 4, each electronic module 35 consists of a flexible printed circuit board 36 on which are a circular sensor coil 40, typically of diameter between 8 mm and 15 mm; an amplifier 41, a signal digitiser 42, and a radio-frequency aerial 43. The circuit board 36 is sufficiently flexible to bend to the curvature of the layer 32, and the components are mounted on the circuit board 36 in such a way as to allow for this bending. When radio-frequency signals are received by the aerial 43 this provides power to the components of the electronic module 35, enabling the signals detected by the sensor coil 40 to be amplified, digitised and then transmitted digitally to an external radio-frequency receiver 48 (see FIG. 5). In this respect it is analogous to an RFID tag. Alternatively the electronic modules 35 may be provided with power by an externally-applied alternating magnetic field. Since the electronic module 35 is powered in a non-contact manner, and transmits its detected data by radio signals, it avoids the need for any electrical connections through the outer sheath 34. In a modification, the electronic module 35 may include a battery (not shown), so the electronic circuitry can operate continuously, the battery being recharged when radio-frequency signals are received. The received radio-frequency signals may also provide timing information.

By way of example the transmitted radio signals, and the received radio signals, may be in the UHF or microwave frequency range. Suitable frequencies would be therefore in the range 860 MHz-930 MHz (UHF) or 2.45 GHz (microwave). Such high frequency transmissions are not significantly affected by the presence of steel structures, and do not need large antennas, and provide higher data transfer rates compared with lower frequency systems. Microwave transmissions are somewhat more susceptible to performance degradation due to the presence of metals and liquids than are UHF transmissions, and are also directional. For example an operating frequency in Europe and the UK may be a frequency in the UHF range, 868-870 MHz, as this provides a good balance between range and performance, and is not likely to suffer from interference. The data transmission may utilise frequency modulation, or alternatively may use orthogonal frequency-division multiplexing or phase-shift keying which are digital techniques. The signals derived from each coil 40 may be distinguished by allocating each electronic module an identifying reference number, which is transmitted along with the associated data.

Although the electronic module 35 is shown as incorporating only a single coil 40, in a modification the printed circuit board 36 might carry more coils 40, as a plurality of coils 40 may be able to utilise the same amplifier 41, digitiser 42 and aerial 43. For example there might be two coils 40, for example one at each end, or with a somewhat larger printed circuit board 36 there might be one coil 40 adjacent to each corner, and so four altogether.

Connecting the riser 10 to the end fitting 24 sometimes involves trimming off an end part of the riser 10. Nevertheless there remains a significant length near the end that as described above incorporates the electronic modules 35.

During use of the riser 10 the greatest stress on the ligaments in the layers 18 and 20, and the greatest risk of failure, occurs near the end fitting 24, and often within the stiffening sleeve 26. If the ligaments in the outer layer 20 are subjected to an alternating magnetic field whose amplitude is well below that required for magnetic saturation, the signals as detected by the coils 40 in the electronic modules 35 may enable the stress in those ligaments to be measured and monitored.

Figure 5:
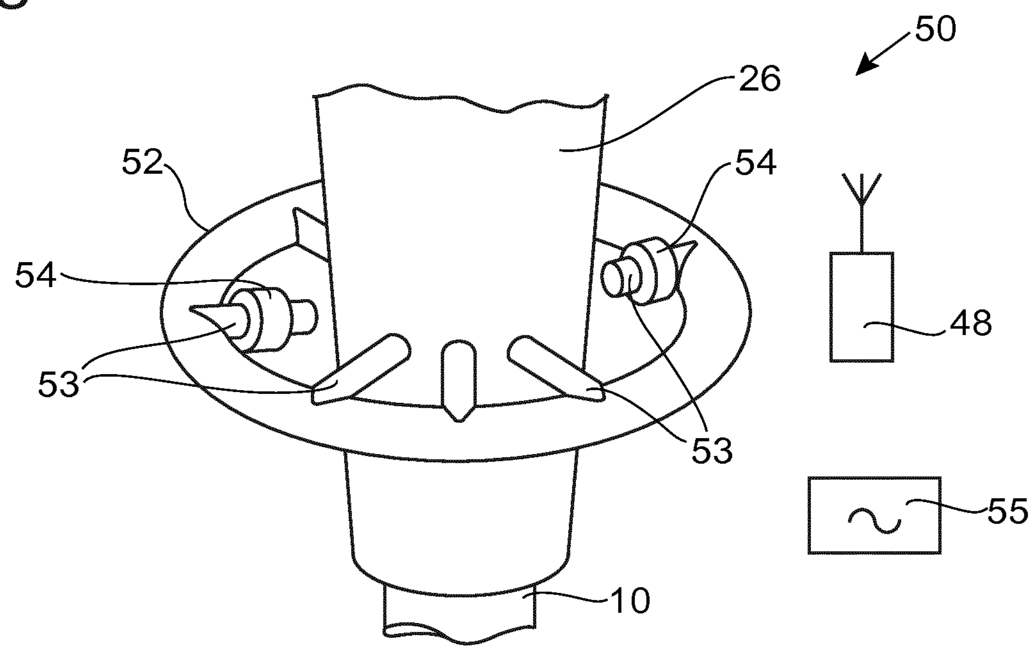
FIG. 5 shows a perspective view of apparatus that incorporates the riser with the electronic modules.

As shown in FIG. 5, an apparatus 50 for measuring or monitoring the stress would incorporate a radio-frequency transmitter/receiver 48 to provide power to the electronic modules 35 and to detect signals from the electronic modules 35. The figure shows also an end part of the stiffening sleeve 26 surrounding the riser 10 at a position where stress measurements are to be made. In this case the apparatus 50 includes a ferromagnetic yoke 52 which surrounds the stiffening sleeve 26, and which incorporates eight radially-projecting studs 53, each of which is provided with a drive coil 54 (only two of which are shown).

In operation an alternating current is supplied by a power supply module 55 (shown schematically) to two diametrically-opposite drive coils 54, such as those shown, so as to create an alternating magnetic field in a radial direction in the vicinity of the ligaments of the outer layer 20 that are below those two studs 53, the magnetic field being considerably less than that required for magnetic saturation. Typically the studs 53 are of such a size that the magnetic field is substantially uniform over two or three side-by-side ligaments on each side of the riser 10. The signals from the electronic modules 35 that have sensor coils 40 radially above those ligaments are therefore downloaded by the radio-frequency receiver 48. These signals can be analysed to deduce the stresses in those ligaments.

The alternating current would then be supplied to another pair of drive coils 54 (not shown) on diametrically-opposite studs 53, so as to create an alternating magnetic field in the vicinity of a second set of ligaments in the outer layer 20; and the signals from the appropriate electronic modules 35 whose sensor coils 40 are radially above the ligaments of this second set would therefore be downloaded by the radio-frequency receiver 48. This can be repeated for each pair of diametrically-opposite studs 53. Thus by sequentially applying the alternating current to all the different sets of diametrically-opposite drive coils 54, the alternating magnetic field can be created in the vicinity of all the ligaments in the outer layer 20, and from the signals from the electronic modules 35 the stresses in all the ligaments can therefore be calculated.

In a modification to this procedure the alternating magnetic field may be generated by energising two adjacent drive coils 54 and also two diametrically opposite drive coils 54. If the currents provided to two adjacent drive coils 54 are in phase and of the same amplitude, then the alternating magnetic field will effectively be midway between the radial positions of the adjacent drive coils 54. By supplying to the two adjacent drive coils 54 drive currents that are in phase but of different amplitudes, the alternating magnetic field can effectively be moved to different positions between those radial positions. This procedure enables the alternating magnetic field to be gradually moved around the entire circumference of the riser 10, so enabling signals to be obtained from electronic modules 35 above all the ligaments of the inner and outer layers 18 and 20.

Rather than applying the alternating current to pairs of drive coils 54 that are on diametrically-opposite studs 53, the alternating current may instead be provided to pairs of drive coils 54 on studs 53 that are less far apart, for example at an angular separation of 90° or 45° around the yoke 52. It will be appreciated that in a modification the yoke 52 may have a different number of radially-projecting studs 53, giving a different angular separation between adjacent studs 53. For example with such a modified yoke 52 the alternating current may be provided to pairs of drive coils 54 on studs 53 at for example 30° or 60° angular separation.

The apparatus 50, in each of the different modes of operation described above, uses a radial magnetic field in the vicinity of the ligaments of the outer layer 20. It will be appreciated that the stress measurement process may instead use a magnetic field generated differently, and at least in part having a different orientation.

Figure 6:
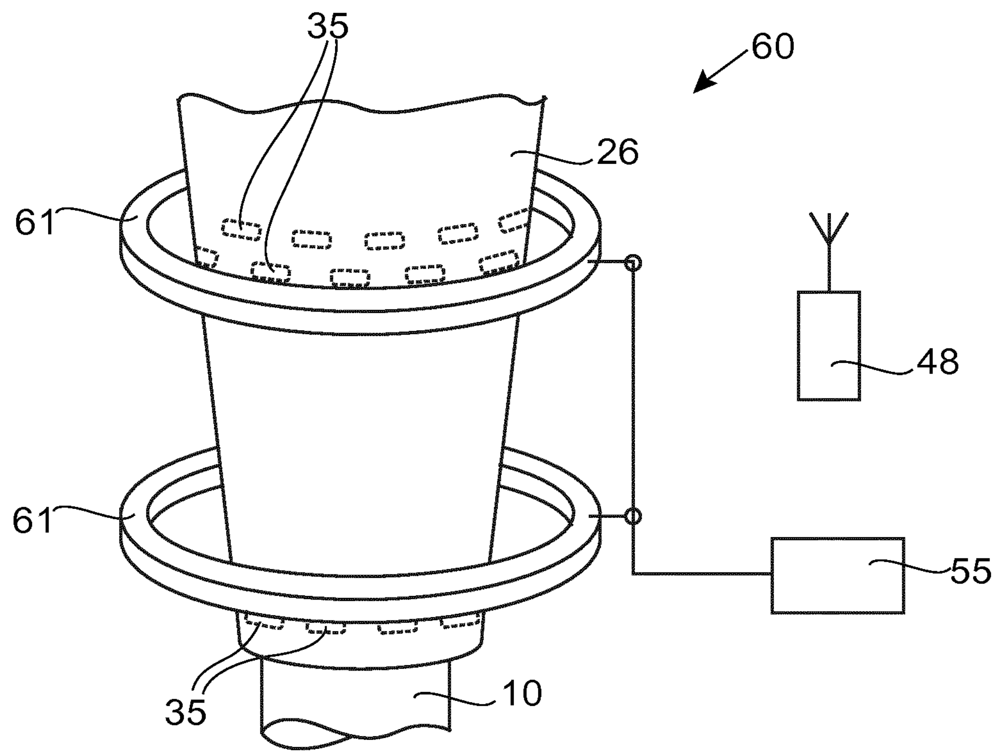
FIG. 6 shows a perspective view of an alternative apparatus that incorporates the riser with the electronic modules.

Referring now to FIG. 6, an alternative apparatus 60 for measuring or monitoring the stress incorporates a radio-frequency transmitter/receiver 48 to provide power to the electronic modules 35 (the positions of some of the modules 35 being indicated by broken lines) and to detect signals from the electronic modules 35; and an alternating current power supply module 55. These features are as described above in relation to the apparatus 50. The figure shows also an end part of the stiffening sleeve 26 surrounding the riser 10 at a position where stress measurements are to be made. In this case the alternating magnetic field is partly in an axial direction, being created by two circular coils 61 spaced apart axially. The same alternating electrical current is provided to each of these coils 61, so in this case the magnetic field is substantially uniform around the circumference of the riser 10, and measurements can be taken from the electronic modules 35 all around the circumference without changing the electrical connections. The measurements are taken from those electronic modules 35 that are adjacent to the two coils 61, where the magnetic field has a radial component.

In a modification, the apparatus 60 may utilise a single such coil 61, with measurements being taken from those electronic modules 35 that are adjacent to the coil 61, either above or below.

Figure 7:
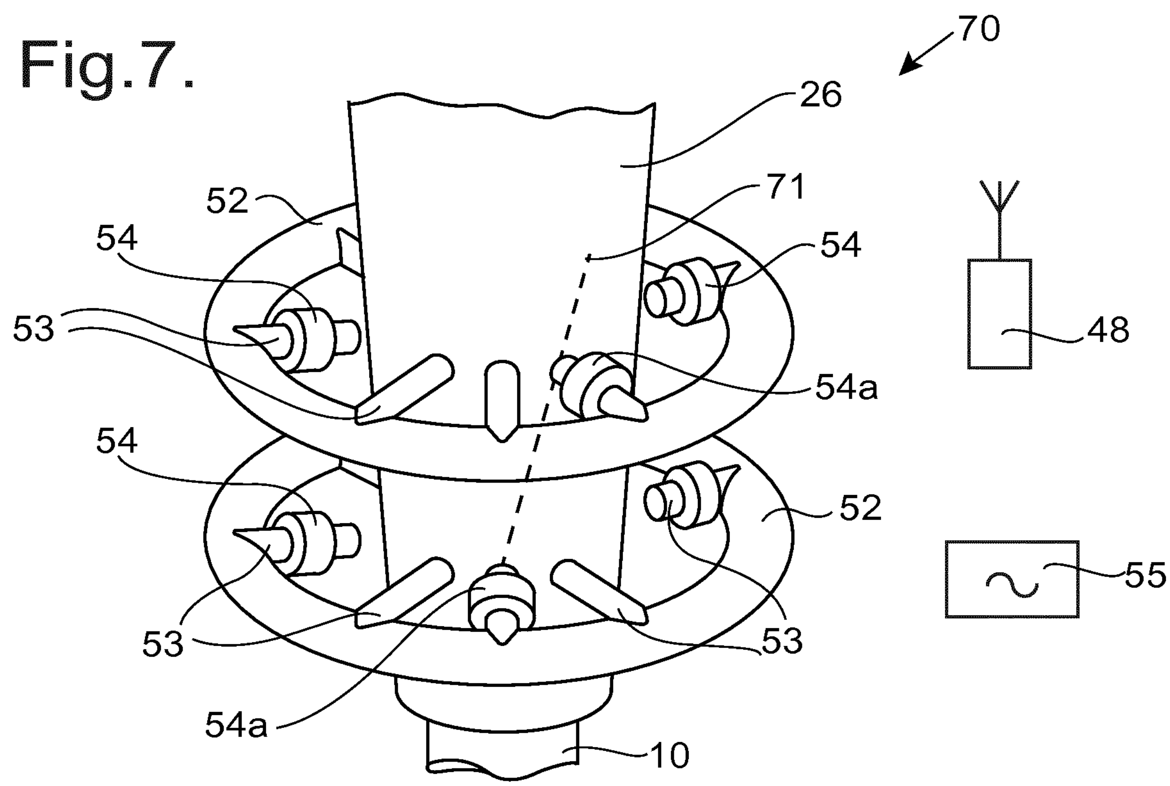
FIG. 7 shows a perspective view of a modification to the apparatus of FIG. 5.

Referring now to FIG. 7 there is shown an alternative apparatus 70, which is a modification to the apparatus 50 of FIG. 5. The apparatus 70 differs in including two of the ferromagnetic yokes 52 which are arranged to surround the stiffening sleeve 26, and each of which incorporates eight radially-projecting studs 53, each of which is provided with a drive coil 54 (only four of which are shown). The two yokes 52 are spaced apart axially along the stiffening sleeve 26 which surrounds the end of the riser 10.

In operation an alternating current is supplied by a power supply module 55 (shown schematically) to two drive coils 54 in different yokes 52, so as to create an alternating magnetic field in a radial direction in the vicinity of the yoke 52 but in a generally axial direction between the yokes 52. The magnetic field as previously described is considerably less than that required for magnetic saturation in the wires of the riser 10. By way of example, the broken line 71 may indicate the approximate path of a wire of the outer layer 20; and by providing the alternating current to the drive coils marked 54*a* that are aligned with that broken line 71, the alternating magnetic field may be arranged to extend predominantly along the length of the wire. Typically the studs 53 are of such a size that the magnetic field is substantially uniform over two or three side-by-side such wires, and is a length-wise magnetic field over those two or three wires between the studs 53. The signals from the electronic modules 35 that have sensor coils 40 radially above those wires are therefore downloaded by the radio-frequency receiver 48. These signals can be analysed to deduce the stresses in those wires.

The alternating current may then be supplied to another two drive coils 54 on different yokes 52, on studs 53 that are aligned with another set of wires in the outer layer 20 (or in the inner layer 18) so as to create an alternating magnetic field lengthwise in those wires. Thus by sequentially applying the alternating current to different combinations of drive coils 54 on the two different yokes 52, the alternating magnetic field can be applied lengthwise to all the wires in the outer layer 20, and from the signals from the electronic modules 35 the stresses in all these wires can therefore be compared or calculated.

Although the yokes 52 are shown as being circular, and surrounding the stiffening sleeve 26, it will be appreciated that the apparatus 70 may instead use a yoke or core of a different shape. For example the apparatus 70 may be modified by using a C-core arranged with its poles spaced apart lengthwise along the riser 10: for example a ferromagnetic C-core may extend between poles at the locations of the drive coils 54*a* as shown in FIG. 7.

The apparatus 50, 60 or 70 may be used to measure stress in the ferromagnetic material forming the ligaments in the layers 18 or 20 by a method such as that described in EP 1 436 604. An alternating current of a desired frequency and amplitude is supplied to the drive coils 54 or 61, so the magnetic field in the ligaments oscillates with an amplitude much less than saturation. The magnetic field may oscillate about zero, or alternatively there may be a steady magnetic field in addition to the alternating magnetic field. The sensor coils 40 provide signals, and the signals are analysed into components in phase and in quadrature with the alternating current supplied to the drive coils 54 or 61. Before the signals are processed they may be amplified and digitised.

Measurements may be taken using different frequencies of the alternating current, and so of the magnetic field. Measurements may also be taken with different stresses in the riser 10, for example by changing the pressure of the fluids within the riser 10. This should change the stresses in all the wires or ligaments in both layers 18 and 20, and can assist in distinguishing between residual stresses and applied stresses. In some cases the residual stresses vary significantly between the different wires or ligaments in each layer 18 and 20. The externally-applied stress in the riser 10 should change the stresses in all the wires or ligaments, but if a wire or ligament is broken then its stress will not be significantly altered by changes in the externally-applied stress. Hence the presence of a broken wire or ligament may be detected from the observation that the measured stress in that broken wire or ligament is not altered by a change in the externally-applied stress.

As previously mentioned, the first stage of the signal analysis involves digitisation, and resolving the signals into in-phase and quadrature components. Backing off (removal of a constant value) may optionally also be applied to the signals. The resulting signals may be used to obtain a stress-dependent measurement that is unaffected by lift-off (i.e. the radial distance between the sensor coil 40 and the ligament), and so to deduce values of stress in the ligament, and this may utilise signals obtained at multiple different frequencies, for example at five or ten different frequencies.

This analysis is somewhat complex, as the signals are affected by a range of different parameters. Although the wires or ligaments of the layers 18 and 20 are indicated in FIG. 1 as being accurately parallel and at fixed spacing, they must be free to move in order to provide flexibility to the riser 10, so in practice the exact orientations and separations of the ligaments will vary, and indeed adjacent ligaments may come into contact with each other. If adjacent ligaments contact each other at more than one position, they would constitute a circuit for an electric current induced by the magnetic field (such a circuit may be referred to as a current loop). So the signals from the sensor coils 40 are not only affected by the stress in the wires, they are also affected by variations of lift-off (i.e. the radial distance between the ligament and the probe), by variation in the spacing of the wires, and by the presence of any current loops. However, since these parameters give different effects at different frequencies, the measurements at multiple different frequencies enable them to be distinguished from each other. Furthermore, measurements may be made at different stresses, for example by altering the fluid pressure within the riser 10. Hence the signals can be analysed to provide information on stress in the wires of the intermediate layer 18, or stress in the wires of the outer layer 20, or the separation of the wires in the intermediate layer 18, or the separation of the wires in the outer layer 20.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flexible hose comprising a generally cylindrical tubular structure comprising at least one layer of steel ligaments near the outer longitudinally-extending surface, the steel ligaments being enclosed within a tubular layer comprising polymeric material, wherein the flexible hose also incorporates a multiplicity of sensing coils embedded within the tubular layer, each such sensing coil being a flat coil lying in a plane substantially parallel to the adjacent layer of steel ligaments, so that an axis of the coil orthogonal to the plane of the flat coil extends in a radial direction relative to the tubular structure.

2. The flexible hose according to claim 1 wherein each sensing coil is connected electrically to a signal processing circuit for amplifying and digitizing signals from the coil, the signal processing circuit also being embedded within the tubular layer.

3. The flexible hose according to claim 2 wherein the signal processing circuit comprises a power-receiving circuit for obtaining power from a radio-frequency electromagnetic field, and a transmission circuit for transmitting data by radio-frequency signals to an external radio-frequency receiver.

4. The flexible hose according to claim 2 further comprising a multiplicity of circuit boards embedded within the tubular layer, wherein each sensing coil is mounted on a circuit board embedded within the tubular layer, the circuit board also carrying the signal processing circuit for amplifying and digitizing signals from the sensing coil.

5. The flexible hose according to claim 4 wherein each circuit board carries a single sensing coil.

6. The flexible hose according to claim 2 wherein each circuit board embedded within the tubular layer is a flexible circuit board.

7. A method of monitoring or detecting stress in steel ligaments within a flexible hose, wherein the flexible hose is the flexible hose according to claim 1, the method comprising subjecting the steel ligaments in the vicinity of the sensing coils to an alternating magnetic field less than saturation by means of at least one drive coil and a current source, receiving data from the sensing coils, and analyzing the data to provide information about the stress in the steel ligaments.

8. The method according to claim 7, wherein the data from the sensing coils is received by radio-frequency transmission.

9. The method according to claim 7 wherein the hose in the vicinity of the sensing coils is subjected to an alternating magnetic field by arranging at least one drive coil that encircles the hose in the vicinity of the sensing coils.

10. The method according to according to claim 9, wherein the alternating magnetic field is generated by two drive coils spaced apart axially along the hose.

11. The method according to claim 7 wherein the hose in the vicinity of the sensing coils is subjected to an alternating magnetic field in a direction that is radial relative to the longitudinal axis of that portion of the hose, by using the at least one drive coil in combination with a ferromagnetic yoke with radially-extending pole pieces.

12. The method according to claim 11 wherein the radially-extending pole pieces used to generate the alternating magnetic field are diametrically opposite each other relative to the longitudinal axis of the hose.

13. The method according to claim 12 wherein the ferromagnetic yoke is circular, and is arranged to surround the hose, the yoke being provided with at least one pair of diametrically opposite radially-extending pole pieces.

14. The method according to claim 11 wherein the magnetic field is generated using drive coils and two ferromagnetic yokes spaced apart along the length of the hose, so that ligaments within the hose between the two yokes are subjected to a magnetic field that is at least partly parallel to the ligaments.

15. The method according to claim 7 wherein the current source is arranged to supply a plurality of different frequencies in succession to each drive coil.

* * * * *